United States Patent Office 3,843,511
Patented Oct. 22, 1974

3,843,511
PROCESS FOR PREPARING SYNTHETIC PETROLATUM
Charles M. Selwitz, Monroeville, Pa., assignor to Gulf Research & Development Company, Pittsburgh, Pa.
No Drawing. Filed Oct. 24 1973, Ser. No. 409,244
Int. Cl. C07c 3/02, 5/22; C10g 11/04, 43/02
U.S. Cl. 208—120                                     6 Claims

ABSTRACT OF THE DISCLOSURE

A process for preparing synthetic petrolatum which involves passing alpha olefins having 30 or more carbon atoms over silica alumina at a temperature of about 200° to about 260° C.

---

This invention relates to a process for preparing synthetic petrolatum from alpha olefins having 30 or more carbon atoms. Petrolatum can be used as a lubricant, as a waterproofing agent, as a medical unguent, etc.

The process for preparing synthetic petrolatum defined and claimed herein involves passing an alpha olefin or a mixture of alpha olefins having 30 or more carbon atoms, generally no higher than 50 carbon atoms, but preferably having from 30 to 40 carbon atoms, over silica alumina at a temperature of about 200° to about 260° C., preferably about 220° to about 250° C. at a linear hourly space velocity (volume of alpha olefins per volume of silica aluminum per hour) of about 0.010 to about 20, preferably about 0.10 to about 10. Preferably, prior to passage over the silica alumina the alpha olefins are heated to a temperature at which they become liquid, for example, in the range of about 70° to about 100° C. Pressures are preferably atmospheric, although pressures as high as about 100 pounds per square inch gauge (7.03 kilograms per square centimeter) can be used. As a result of the treatment the hard, brittle olefins are converted to a soft, unctuous material suitable as a synthetic Vaseline.

Any of the conventional silica aluminas can be employed. For example, a typical silica alumina will contain from about five to about 95 percent by weight of silica, preferably about 65 to about 85 percent by weight of silica, with substantially all of the rest being alumina. Particle size can be from about five to about 100 mesh, preferably about 10 to about 20 mesh.

Alpha olefins from any source can be used herein. A preferred source of such alpha olefins are those alpha olefins having 30 or more carbon atoms obtained as a result of the polymerization of ethylene in the presence of an alkyl aluminum, such as triethylaluminum, at elevated temperatures and elevated pressures. An example of such procedure is defined in U.S. Pat. No. 3,482,000 to Fernald et al. dated Dec. 2, 1969, which patent is hereby incorporated in by reference.

The process can further be illustrated by the following. An alpha olefin fraction obtained by the polymerization of ethylene in the presence of triethylaluminum, as defined in said patent to Fernald et al., having an average carbon number of 32.5, was passed over several silica aluminas under varying reaction conditions. The carbon number distribution of the alpha olefin fraction used is set forth below in Table I.

TABLE I

| Carbon number | Weight percent |
|---|---|
| 20 | 0.12 |
| 22 | 0.63 |
| 24 | 2.12 |
| 26 | 6.13 |
| 28 | 12.57 |
| 30 | 16.27 |
| 32 | 15.87 |
| 34 | 12.96 |
| 36 | 16.61 |
| 38 | 7.78 |
| 40 | 5.97 |
| 42 | 3.65 |
| 44 | 2.65 |
| 46 | 1.65 |
| 48 | 1.02 |

In the above mixture 21.57 weight percent of the fraction had a carbon number of 28 or less, while 78.43 weight percent had a carbon number of 30 and above. Also, 62±5.0 weight percent of the mixture was trans, 67.5±5.0 weight percent was alpha and 26.3±5.0 weight percent was vinylene ($R_2C=CH_2$). The results obtained are tabulated in Table II.

TABLE II

| Run number | Temp., °C. | Feed rate, milliliters per hour | Silica alumina used | Mesh size | Catalyst volume, milliliters | Linear hourly space velocity | Appearance | Properties |
|---|---|---|---|---|---|---|---|---|
| 1 | 240 | 10 | American Cyanamid AAA silica alumina | 10 | 10 | 1.0 | Very soft | Not analyzed. |
| 2 | 240 | 30 | do | 10 | 10 | 10 | do | See Table III. |
| 3 | 180 | 200 | do | 10 | 425 | 0.472 | Softened slightly | Not analyzed. |
| 4 | 200 | 100 | do | 10 | 236 | 0.236 | Softer than run No. 3 | Do. |
| 5 | 180 | 180 | do | | | | | |
| 6 | 210 | 200 | do | 10 | 425 | 0.472 | Petrolatum consistency | See Table III. |
| 7 | 180 | 4.5 | Davison silica alumina | 10–20 | 30 | 0.150 | Not softened | Not anlayzed. |
| 8 | 190 | 4.5 | do | 10–20 | 30 | 0.150 | Somewhat softer | Do. |
| 9 | 240 | 4.5 | do | 10–20 | 30 | 0.150 | Very soft | Do. |
| 10 | 180 | 5 | American Cyanamid AAA silica alumina | | 30 | 0.166 | Not softened | Do. |
| 11 | 200 | 5 | do | | 30 | 0.166 | Somewhat softened | Do. |
| 12 | 240 | 5 | do | | 30 | 0.166 | Soft | Do. |

The comparison of the properties of the charge with the products obtained in Runs Nos. 2 and 6 above and with petrolatum is set forth below in Table III.

TABLE III

| | Olefin fraction used in Table II | Run No. 2 | Run No. 6 | Petrolatum |
|---|---|---|---|---|
| Melting point D-127° F | 166 | 166 | 171 | 110–175 |
| Penetration D-1403 | 14 | 185 | | 40–300 |
| Viscosity SUS D-461, 210° F. (99° C.) | 8.0 | 62.9 | 71.2 | 60–120 |
| Appearance | (1) | (2) | (2) | (2) |

[1] Hard, brittle.  [2] Soft, tacky.

The above illustrates that the treated product obtained herein falls easily within the specifications of natural petrolatum. Although no analysis was made of the products made in Runs Nos. 1, 4, 9, 11 and 12, the appearance and feel of the product was that of natural petrolatum. The products of Runs Nos. 3, 5, 7, 8 and 10 prepared at temperatures outside the operative ranges herein proved to be unacceptable as petrolatum substitutes.

The results obtained herein are unexpected. In U.S. Pat. No. 2,620,365 Anderson states that when a high-boiling alpha olefin, such, for example, as 1-octadecene, is treated with an active silica alumina catalyst of the type conventionally employed in catalytic cracking operations at a temperature in the range of about 300° to 650° F. (149° to 343° C.), its melting point (which may be considered as its pour point) may be lowered by as much as 50° F. (about 28° C.), depending upon the severity of the treatment. On this basis one skilled in the art, who would want to convert an alpha olefin to synthetic petrolatum, would not treat a solid, crystalline alpha olefin with silica alumina, for to do so would so reduce its melting point as to render the same a liquid rather than a soft, tacky, unctuous material suitable as a synthetic petrolatum. Surprisingly, as the above data show, the product obtained herein has a melting point on the same order as the charge but still has the same physical properties as petrolatum.

Obviously, many modifications and variations of the invention, as hereinabove set forth, can be made without departing from the spirit and scope thereof, and, therefore, only such limitations should be imposed as are indicated in the appended claims.

I claim:

1. A process for preparing a synthetic petrolatum which involves passing alpha olefins having 30 or more carbon atoms over silica alumina at a temperature of about 200° to about 260° C.

2. The process of claim 1 wherein said temperature is in the range of about 220° to about 250° C.

3. The process of claim 1 wherein a mixture of alpha olefins in the range of 30 to 50 carbon atoms are passed over silica alumina.

4. The process of claim 1 wherein a mixture of alpha olefins in the range of 30 to 40 carbon atoms are passed over silica alumina.

5. The process of claim 1 wherein the alpha olefins are passed over the silica alumina at a linear hourly space velocity of about 0.010 to about 20.

6. The process of claim 1 wherein the alpha olefins are passed over the silica alumina at a linear hourly space velocity of about 0.10 to about 10.

References Cited
UNITED STATES PATENTS

| | | | |
|---|---|---|---|
| 2,620,365 | 12/1952 | Anderson | 260—683.15 |
| 3,482,000 | 12/1969 | Fernald et al. | 260—683.15 |

DELBERT E. GANTZ, Primary Examiner

G. E. SCHMITKONS, Assistant Examiner

U.S. Cl. X.R.

208—21, 24; 260—683.15 R, 683.2